United States Patent [19]

Mabuchi et al.

[11] Patent Number: 4,631,206
[45] Date of Patent: Dec. 23, 1986

[54] METHOD FOR CURING POLYURETHANE COATING

[75] Inventors: Akira Mabuchi, Nagoya; Kenji Yano; Hisashi Mizuno, both of Inazawa, all of Japan

[73] Assignee: Toyoda Gosei Co., Ltd., Nishikasugai, Japan

[21] Appl. No.: 758,828

[22] Filed: Jul. 25, 1985

[30] Foreign Application Priority Data

Jul. 30, 1984 [JP] Japan .................................. 59-161313

[51] Int. Cl.$^4$ ........................... B05D 3/02; C09J 3/14; C09J 3/16
[52] U.S. Cl. ............................... 427/340; 156/244.24; 156/331.1; 427/393.5; 428/424.6; 428/424.8
[58] Field of Search ...................... 427/340, 342, 393.5; 428/424.6, 424.8; 528/49, 54, 58, 59; 156/244.24, 331.1

[56] References Cited

U.S. PATENT DOCUMENTS 3,083,118 3/1963 Bridgeford ...................... 427/342 X
3,991,255 11/1976 Blaskiewicz et al. ......... 427/393.5 X
4,520,042 5/1985 Smith ........................... 427/393.5 X

FOREIGN PATENT DOCUMENTS 2738749 3/1978 Fed. Rep. of Germany .

OTHER PUBLICATIONS

*Kunststoff Hand Buck*, vol. 7, Polyurethane, Carl Hanser Verlag, Munchen, (1966), pp. 96–103 and 445–448.

Primary Examiner—Michael R. Lusignan
Attorney, Agent, or Firm—Cushman, Darby & Cushman

[57] ABSTRACT

An uncured polyurethane coating formed by applying polyurethane paint containing isocyanate prepolymer on a substrate is cured by a method which comprises applying a catalyst (cure accelerator) on the uncured polyurethane coating and subsequently exposing the polyurethane coating to a heating atmosphere of 60° to 100° C. By this method, the reaction of urethanation explosively proceeds and the time for curing the coating can be notably cut because the optimum catalyst for the polyurethane coating can be selected without restriction and the catalyst in a highly concentrated state can be brought into contact with the polyurethane coating.

5 Claims, 2 Drawing Figures

METHOD FOR CURING POLYURETHANE COATING

BACKGROUND OF THE INVENTION

1. Field of the Invention

This invention relates to a method for curing a polyurethane coating, and more particularly to a curing method suitable for the polyurethane coating to be formed on the surface of a weather-strip destined to be slid against a glass in an automobile.

2. Description of the Prior Art

On the surface of a weather-strip destined to be slid against a glass in an automobile, a coating 2 of polyurethane paint is superposed as illustrated in FIG. 2 with a view to lowering the sliding resistance and enhancing the resistance to wear. The polyurethane paint used for this purpose is of one-component type or two-component type invariably containing isocyanate prepolymer. The coating formed of either type of polyurethane paint cures slowly. When the coating is left curing at room temperature or at a temperature not exceeding 100° C., the time required for the coating to be cured to a degree enough to acquire required coating properties is so long as to impair productivity of the weather-strip.

In the case of a weather-strip made of EPDM (ethylenepropylene-diene terpolymer), for example, the practice of applying a polyurethane coating on the surface of the weather strip exposed to sliding against the glass and subsequently allowing the applied coating to stand in a heating atmosphere of about 150° C. for 6 to 10 minutes to cure has prevailed to date. Recently, adoption of such a thermoplasitc elastomer as PVC (polyvinyl chloride) or PO (polyolefin) of lower resistance to heat as the substrate for the weather-strip has come to be studied. Consequently, the desirability of developing a method capable of curing the polyurethane coating in a heating atmosphere not exceeding 100° C. in a brief period has been finding growing recognition.

The inventors found the specification of Japanese Patent Publication No. SHO 53(1978)-19,038 to disclose a method for curing a polyurethane coating by treating the coating with a catalyst vapor for a prescribed period. They have studied this method in an attempt to apply this method to the curing of the polyurethane coating on the leather strip, to learn that this method raises the following problems.

(a) This method does not permit use of any catalyst which is not easily vaporized. This fact imposes a limit on the selection of an optimum catalyst for the polyurethane coating.

(b) Where the production of weather-strip is to be carried out continuously, an attempt to incorporate the step for vapor treatment into a closed system proves to be difficult. Inclusion of this vapor treatment, therefore, is detrimental to the safety of the shop environment.

(c) Since the concentration of the catalyst vapor is not allowed to increase appreciably, the time required for the catalyst vapor to pass into the coating is too long to permit a sufficient reduction in the time for curing the coating.

SUMMARY OF THE INVENTION

This invention concerns a method for curing a polurethane coating. This method is characterized by applying a polyurethane coating containing isocyanate prepolymer on a substrate, applying a catalyst (cure accelerator) on the uncured polyurethane coating consequently superposed on the substrate, and subsequently curing the polyurethane coating in a heating atmosphere of 60° to 100° C.

Owing to the construction described above, the method of this invention for curing a polyurethane coating enjoys the following advantages.

(a) Even when the catalyst selected happens to be a solid, it can be transformed as with a solvent into a form readily applicable to a given substrate. This fact permits easy selection of an optimum catalyst for the polyurethane coating.

(b) Even when the solvent used for the application of the catalyst happens to be a volatile substance, the application of the catalyst can be continued by evacuating the vapor of solvent rising from the dissolved catalyst. Thus, the volatility of this solvent does not appreciably jeopardize the safety of shop environment.

(c) Since the optimum catalyst for the polyurethane coating can be selected without any restriction and this catalyst can be applied in its highly concentrated state, the reaction of urethanation proceeds explosively. Thus, the time required for curing the polyurethane coating is cut to a great extent and the productivity of the weather-strip is notably enhanced.

DESCRIPTION OF THE PREFERRED EMBODIMENTS

Figure 1:
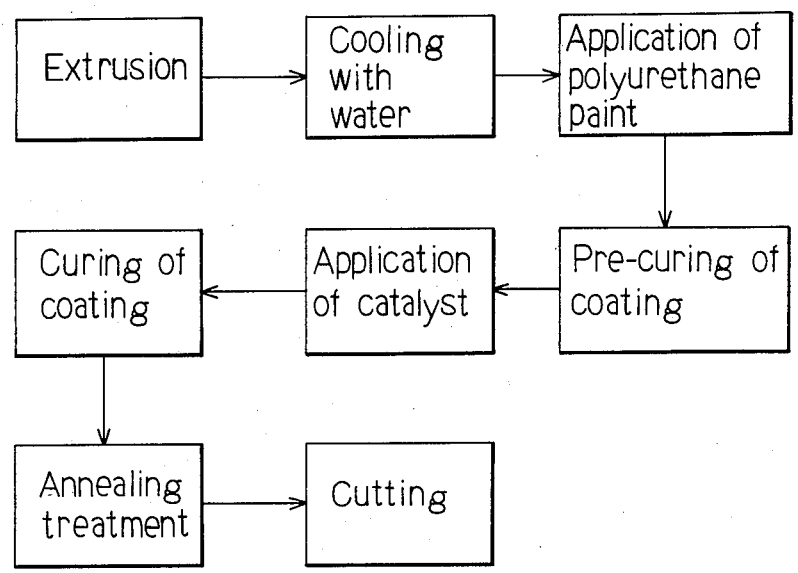
FIG. 1 is a flow diagram illustrating a typical procedure for working the method of this invention.
Figure 2:
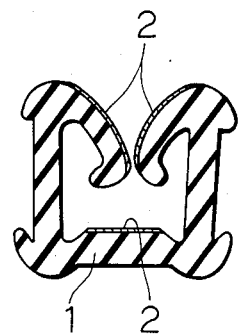
FIG. 2 is a cross section illustrating a typical weather-strip on which the present invention is to be embodied.

On an extrusion molded substrate 1 (surface position 12 exposed to sliding against glass in the case of weather-strip), polyurethane paint is applied to form an uncured polyurethane coating 2. A catalyst (cure accelerator) is applied on this uncured polyurethane coating. The composition so produced was then heated to cure the coating 2.

(a) The material for the substrate is not specifically limited. Examples of the material usable for the substrate include rubber materials such as EPDM and CR (chloroprene rubber), thermoplastic elastomers such as PVC and PO, general-purpose plastic materials, metal, and wood.

(b) The polyurethane paint is not limited to the polyol curing type coating compositions shown below (as disclosed in Japanese Patent Application No. SHO 58(1973)-200,084, for example) but may embrace moisture curing type coating compositions, on the sole condition that they contain isocyanate prepolymer. Optionally, the following coating compositions may incorporate inorganic or organic fillers such as carbon, talc, silica, calcium carbonate, chlorinated polypropylene, and chlorinated polyethylene.

(Coating compositions)

(1) Hydroxyl prepolymer obtained by the reaction of polyester polyol with organic diisocyanate: 100 parts by weight
(2) Castor oil polyol: 0 to 60 parts by weight
(3) Isocyanate prepolymer obtained by the reaction of low molecular polyol with organic diisocyanate: 1 to 100 parts by weight
(4) Fluorine resin: 2 to 100 parts by weight (5) Silicone oil: 2 to 100 parts by weight (c) The aforementioned polyurethane paint is generally diluted to suitable viscosity with one of the organic solvents enumerated blow and then applied on the substrate as by dip coating, spray coating, brush coating, knife coating, or roll coating.

Acetone, methylethyl ketone, methylisobutyl ketone, benzene, toluene, xylene, methyl acetate, ethyl acetate, isopropyl acetate, trichloroethylene, 1,1,1-trichloroethane, and dimethyl formamide.

(d) Examples of the catalyst of the foregoing description are the following amine type and organic tin type catalysts which are capable of accelerating the reaction of urethenation.

1. Amine type—methyl amine, ethyl amine, propyl amine, isopropyl amine, butyl amine, hydrazine, triethylene diamine, dimethylethanol amine, triethanol amine, and phenol salt of 1,8-diaza-bicyclo-(5,4,0)-undecene-7.

2. Organic tin type—dibutyl tin diacetate, dibutyl tin dioctoate, dibutyl tin dilaurate, dibutyl tin diesterate, tributyl tin acetate, tributyl tin octoate, tributyl tin laurate, dioctyl tin diacetate, dioctyl tin dilaurate, diethyl tin dioleate, and monomethyl tin dioleate.

(e) The aforementioned catalyst is generally diluted to 0.5 to 10 wt% with the same solvent as used in the dilution of the aforementioned polyurethane coating. When the catalyst is in a liquid state, it may be used in its undiluted form. It is more desirable to use this catalyst in a diluted form, because the permeation of the catalyst into the polyurethane coating is acceperated by the presence of the solvent.

(f) The heating of the applied uncured polyurethane coating is generally carried out by the use of such heating means as a drier or an oven, at a temperature in the range of 60° to 100° C. for a period in the range of 30 seconds to five minute. If the temperature exceeds 100° C., the heating possibly causes softening and deformation of the substrate when the substrate is made of PVC or some other similar material. If the temperature is less than 60° C., the reaction for polyurethane curing is not induced so quickly as expected. In this case, the polyurethane coating left standing for a prescribed period (three hours) fails to acquire the prescribed degree of resistance to wear. This period, three hours, represents the minimum interval between the time the weatherstrip is shipped out of the plant and the time it is mounted on an automobile.

The mechanism responsible for the notable reduction in the time for the curing of the polyurethane coating remains yet to be elucidated. A logical explanation of this mechanism may be given by the following postulate.

Since the catalyst in its highly concentrated state can be brought into contact with the polyurethane coating, the permeation of the catalyst into the polyurethane coating is accelerated and, at the same time, the application of heat adds to the velocity of the reaction of urethanation.

[Example]

The working examples cited below were effected by the method depicted in FIG. 1. A PVC composition indicated below was extruded at a temperature of 130° to 140° C. in the form of a strip 10 mm in thickness and 29 mm in width. On the substrate thus obtained, a polyurethane coating of the compostion indicated below was applied by roll coating at a rate of 3 mg/cm$^2$ (as solids) and precured at 40° C. for 30 seconds. The coating consequently precured was sprayed with a varying catalyst indicated in Table 1 and diluted with 1,1,1-trichloroethane to the indicated concentration, further cured in a drier oven at 90° C., and subjected to an annealing treatment.

|  | (Parts by weight) |
|---|---|
| 1 PVC composition |  |
| Polymer | 100 |
| Dioctyl phthalate | 75 |
| Barium stearate | 2 |
| Zinc stearate | 1 |
| 2 Polyurethane coating |  |
| Hydroxyl prepolymer*$^1$ | 25 |
| Castor oil polyol | 8 |
| Isocyanate prepolymer*$^2$ | 10 |
| Fluorine resin | 8 |
| Silicone oil | 8 |
| Carbon black | 0.5 |
| Chlorine type organic solvent | 118 |
| Dibutyl tin dilaurate | 0.065 |
| Phenol salt of 1,8-diaza-bicyclo-(5,4,0)-undecene-7 | 0.065 |

*$^1$This prepolymer was obtained by preparing polyester polyol (hydroxyl group number: 56.0) from 1,4-butane diol and adipic acid and allowing this polyol to react with 4,4'-diphenyl methane diisocyanate at an NCO/OH (mol ratio) = 4/5.
*$^2$This prepolymer was obtained by allowing trimethylol propane to react with tolylene diisocyanate at an NCO/OH (mol ratio) = 3/1.

The polyurethane coating obtained in a varying test run described above was left standing for three hours and then subjected to wear resistance test using a wear resistance tester, type KI, under the following conditions. Table 1 shows the time for curing required to pass the wear resistance of 10,000 frictions (no exposure of substrate after 10,000 frictions). Comparative Test Run 2 represents the case in which the curing was effected by use of dimethyl ethanol amine 1000 ppm in concentration (40° C.).

Test conditions

Friction piece: Glass (5 mm in thickness)
Load: 3 kgf
Friction cycle: 60 times/minute
Friction stroke: 145 mm It is noted from the results of Table 1 that in all the test runs conforming with the present invention, the curing time was invariably about 1 minute (Runs 1, 3, 4, and 6), indicating that the method of this invention contributes to greatly cutting the time required for the curing.

TABLE 1

|  | Catalyst | Time of curing (in minutes) required for passing the wear resistance of 10,000 frictions |
|---|---|---|
| Example 1 | Triethylene diamine (1 wt %) | 1 |
| Example 2 | Dibutyl tin dilaurate (1 wt %) | 3 |
| Example 3 | Phenol salt of DBU*$^1$ (1 wt %) | 1 |
| Example 4 | Dimethylethanol amine (1 wt %) | 1 |
| Example 5 | Triethanol amine (1 wt %) | 8 |
| Example 6 | TEDA*$^2$ (0.1 wt %) DBTDL*$^3$ (0.1 wt %) | 1 |
| Comparative | No treatment with | 20 |

TABLE 1-continued

| Catalyst | | Time of curing (in minutes) required for passing the wear resistance of 10,000 frictions |
|---|---|---|
| Experiment 1 | catalyst | |
| Comparative Experiment 2 | Dimethyl ethanol amine vapor 1000 ppm in concentration | 5 |

*¹1,8-Diaza-bicyclo-(5,4,0)-undecene-7
*²Triethylene diamine
*³Dibutyl tin dilaurate

What is claims is:

1. A method for curing a polyurethane coating, comprising the steps of:
   (1) applying a polyurethane paint containing isocyanate prepolymer at a stated position on the surface of a substrate,
   (2) applying a catalyst (cure accelerator) on the uncured polyurethane coating formed in the preceding step (1), and
   (3) subsequently curing said polyurethane coating in a heating atmosphere of 60° to 100° C.

2. A method according to claim 1, wherein said substrate is a thermoplastic elastomer of polyvinyl chloride type or polyolefin type.

3. A method for according to claim 2, wherein said catalyst is at least one member selected from the group consisting of triethylene diamine, dibutyl tin dilaurate, mixture of triethylene diamine and dibutyl tin dilaurate, phenol salt of 1,8-diaza-bicyclo-(5,4,0)-undecene-7, and dimethylethanol amine.

4. A method according to claim 1, wherein said polyurethane paint is a polyol curing type coating composition selected from the group consisting of
   (1) Hydroxyl prepolymer obtained by the reaction of polyester polyol with organic diisocyanate: 100 parts by weight
   (2) Castor oil polyol: 0 to 60 parts by weight
   (3) Isocyanate prepolymer obtained by the reaction of low molecular polyol with organic diisocyanate: 1 to 100 parts by weight
   (4) Fluorine resin: 2 to 100 parts by weight
   (5) Silicone oil: 2 to 100 parts by weight.

5. A method according to claim 1, wherein for the purpose of said application, said catalyst is diluted to 0.5 to 10 wt% with the same solvent as used in the dilution of said polyurethane paint.

* * * * *